(12) United States Patent
Chen et al.

(10) Patent No.: US 7,835,846 B2
(45) Date of Patent: Nov. 16, 2010

(54) NONLINEAR VEHICLE YAW/ROLL/SIDESLIP COMMAND INTERPRETER

(75) Inventors: Shih-Ken Chen, Troy, MI (US); Nikolai K. Moshchuk, Grosse Pointe, MI (US); Flavio Nardi, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 885 days.

(21) Appl. No.: 11/680,127

(22) Filed: Feb. 28, 2007

(65) Prior Publication Data

US 2008/0208406 A1 Aug. 28, 2008

(51) Int. Cl.
*B62D 6/00* (2006.01)
*G06F 19/00* (2006.01)

(52) U.S. Cl. .............................. 701/82; 701/41; 701/80; 180/410

(58) Field of Classification Search .................... 701/82, 701/80, 41; 180/410, 445
See application file for complete search history.

(56) References Cited

U.S. PATENT DOCUMENTS

| | | | |
|---|---|---|---|
| 5,720,533 A | 2/1998 | Pastor et al. | |
| 5,734,595 A * | 3/1998 | Matsuno | 701/104 |
| 6,035,251 A | 3/2000 | Hac et al. | |
| 6,175,790 B1 | 1/2001 | Lin et al. | |
| 6,615,124 B1 * | 9/2003 | Adachi | 701/70 |
| 7,184,868 B2 * | 2/2007 | Matsunaga et al. | 701/38 |
| 2004/0199314 A1 * | 10/2004 | Meyers et al. | 701/38 |
| 2005/0273240 A1 * | 12/2005 | Brown et al. | 701/70 |
| 2006/0030974 A1 * | 2/2006 | Tsukasaki et al. | 701/1 |
| 2007/0162212 A1 * | 7/2007 | Pengov et al. | 701/69 |
| 2008/0086251 A1 * | 4/2008 | Lu et al. | 701/70 |

* cited by examiner

*Primary Examiner*—Tan Q Nguyen
(74) *Attorney, Agent, or Firm*—John A. Miller; Miller IP Group, PLC

(57) ABSTRACT

A command interpreter for a vehicle stability enhancement system that uses a three degree-of-freedom vehicle model employing non-linear suspension and tire characteristics to calculate stability commands. The command interpreter includes a calculator that calculates a front tire lateral force, a calculator that calculates a rear tire lateral force and a command calculator that calculates a yaw-rate command signal, a lateral velocity command signal and a roll angle command signal. The front tire lateral force calculator and the rear tire lateral force calculator calculate the front and rear side-slip angles. The side-slip angles are then converted to a lateral force, where the conversion is selected based on the tire vertical load. The rear tire lateral force is modified for high side-slip angles so that the rear tire lateral force does not become saturated.

20 Claims, 4 Drawing Sheets

US 7,835,846 B2

NONLINEAR VEHICLE YAW/ROLL/SIDESLIP COMMAND INTERPRETER

BACKGROUND OF THE INVENTION

1. Field of the Invention

This invention relates generally to a command interpreter for a vehicle stability enhancement system and, more particularly, to a command interpreter for a vehicle stability enhancement system that uses a three degree-of-freedom vehicle model with non-linear suspension and tire characteristics for calculating the stability command signals.

2. Discussion of the Related Art

Various vehicle stability control systems are known in the art that improve driver convenience, safety and comfort. These stability control systems typically employ differential braking, active or semi-active suspension, active front steering and/or active rear wheel steering to provide the stability control. The control system measures the driver's desire of vehicle performance to control inputs, such as steering wheel, brake pedal, etc., and compares the vehicle response with the desired maneuver. The vehicle stability control system usually includes a command interpreter to determine the driver's desire.

The stability control system typically receives vehicle dynamics information from various sensors, such as yaw rate sensors, lateral acceleration sensors, vehicle speed sensors, wheel speed sensors, hand-wheel angle sensors, tire force sensors, wheel force sensors, roll rate sensors, etc. to calculate or estimate various vehicle parameters and states. The vehicle parameters and states are then used to provide actuator command signals to provide the stability control. For vehicle rollover control, it is typically important to limit roll motion and side-slip motion in addition to yaw motion. Therefore, in order to provide rollover mitigation, suitable command signals are typically required for generating the desired yaw-rate command, roll angle command and side-slip command.

SUMMARY OF THE INVENTION

In accordance with the teachings of the present invention, a command interpreter for a vehicle stability enhancement system is disclosed, where the command interpreter uses a three degree-of-freedom vehicle model employing non-linear suspension and tire characteristics to calculate driver desired commands. The command interpreter includes a calculator that calculates a front tire lateral force, a calculator that calculates a rear tire lateral force and a command calculator that calculates a yaw-rate command signal, a lateral velocity command signal and a roll angle command signal. The front tire lateral force calculator and the rear tire lateral force calculator calculate the front and rear side-slip angles of the vehicle. The side-slip angles are then applied to a look-up table that converts the side-slip angle to a lateral force, where the look-up table is selected based on the tire vertical load. The rear tire lateral force is modified for high side-slip angles so that the rear tire lateral force does not become saturated. The command calculator uses the front and rear tire lateral forces and other measured vehicle input signals to calculate the yaw-rate command signal, the side-slip velocity command signal and the lateral velocity command signal and the roll angle command signal using the vehicle model.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a command interpreter for a vehicle stability enhancement system is merely exemplary in nature, and is in no way intended to limit the invention or its applications or uses.

Figure 1:
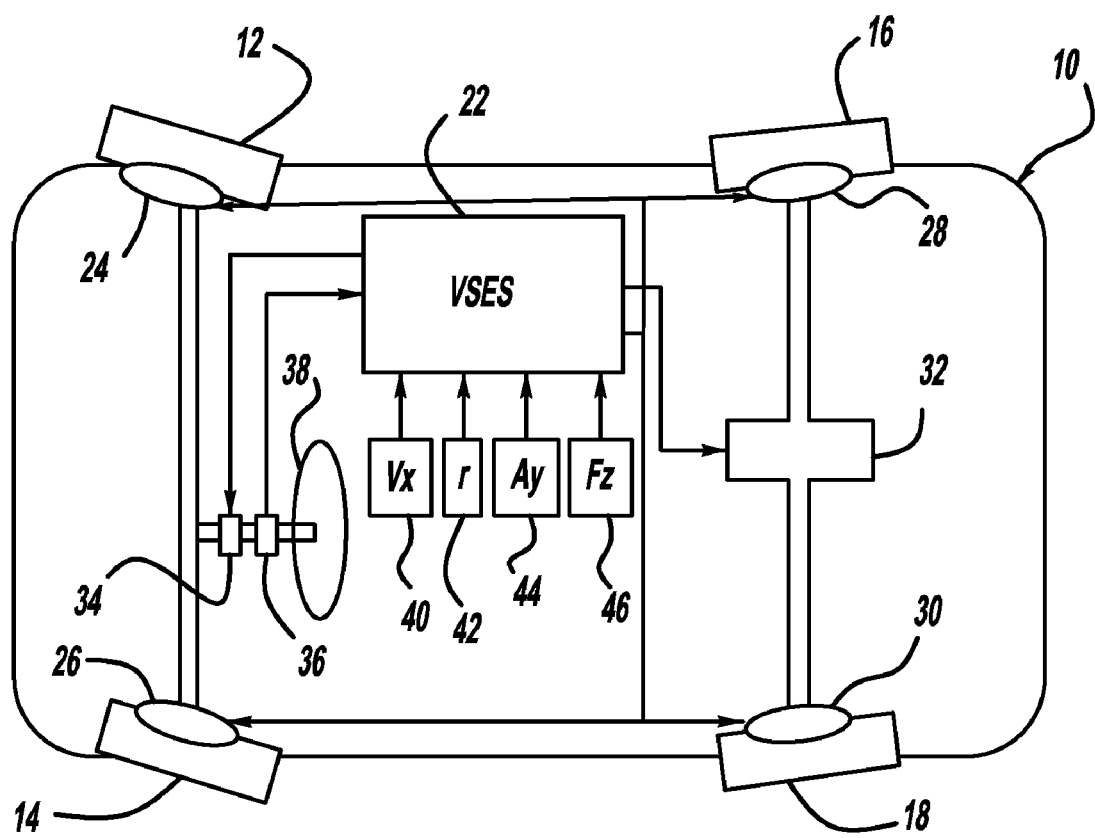
FIG. 1 is a plan view of a vehicle including a vehicle stability enhancement system.

FIG. 1 is a plan view of a vehicle 10 including front wheels 12 and 14 and rear wheels 16 and 18. The vehicle 10 also includes a vehicle stability enhancement system (VSES) 22 that provides vehicle stability control. The VSES 22 can provide control signals to various actuators on the vehicle 10 to provide the control, such as differential braking for braking actuators 24, 26, 28 and 30 of the wheels 12, 14, 16 and 18, respectively, an active rear-wheel steering control actuator 32 and an active front steering actuator 34, all of which are well known to those skilled in the art. The VSES 22 receives signals relating to various vehicle states from various sensors, including a hand-wheel angle sensor 36 for measuring the angle of a vehicle hand-wheel 38 to provide a signal δ indicative of the steering angle of the front wheels 12 and 14. The VSES 22 also receives a vehicle speed signal $V_x$ from a vehicle speed sensor 40, a yaw-rate signal r from a yaw rate sensor 42, a lateral acceleration signal $A_y$ from a lateral acceleration sensor 44 and a tire vertical load signal $F_z$ from a tire load sensor 46 of the vertical tire force on all of the wheels 12, 14, 16 and 18, all of which are well known to those skilled in the art. The tire load sensor 46 is intended to represent a load sensor for each of the wheels 12, 14, 16 and 18, which are independently measured. In an alternate embodiment, the vertical load on the wheels 12, 14, 16 and 18 can be estimated using various known algorithms.

Figure 2:
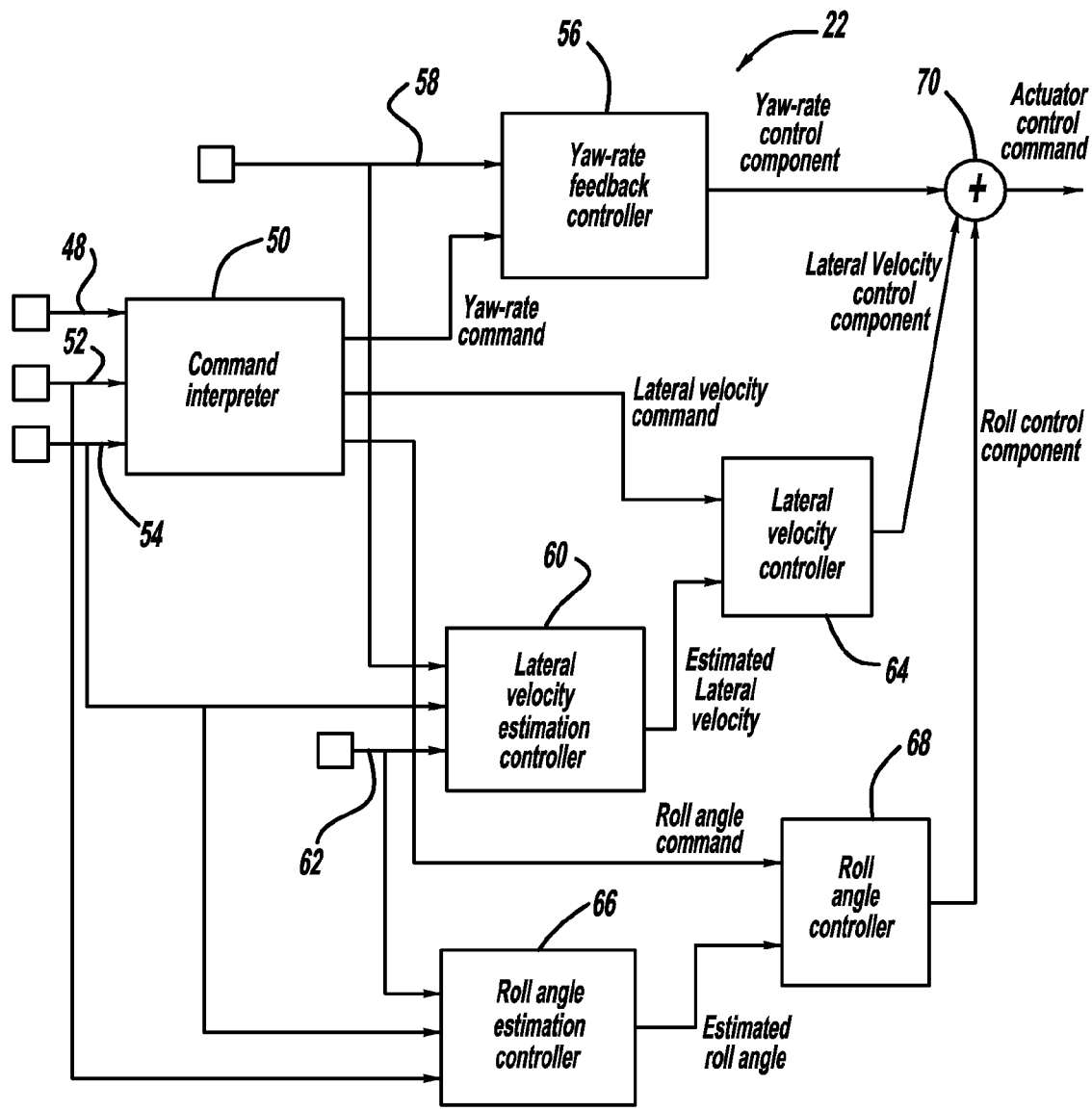
FIG. 2 is a block diagram of the vehicle stability enhancement system shown in FIG. 1, including a command interpreter employing a three degree-of-freedom vehicle model, according to an embodiment of the present invention.

FIG. 2 is a block diagram of the VSES 22. The VSES 22 includes a command interpreter 50 that receives the hand-wheel angle signal δ on line 52 from the hand-wheel angle sensor 36, the vehicle speed signal $V_x$ on line 54 from the vehicle speed sensor 40 and the tire vertical load signal $F_z$ on line 48 from the load sensor 46. As will be discussed in detail below, the command interpreter 50 employs a three degree-of-freedom vehicle model with non-linear suspension and tire characteristics to determine a driver desired yaw-rate command signal r, a lateral velocity command signal $V_y$ and roll angle command signal φ.

The VSES 22 also includes a yaw-rate feedback controller 56 that receives the yaw-rate signal r from the yaw rate sensor 42 on line 58 and the yaw-rate command signal r from the command interpreter 50. The yaw-rate feedback controller 56 uses any suitable algorithm, many of which are known in the art, to provide a yaw-rate control component signal to minimize the difference between the measured vehicle yaw rate and the desired vehicle yaw rate.

The VSES 22 also includes a lateral velocity estimation controller 60 that receives the yaw-rate signal r on the line 58, the vehicle speed signal $V_x$ on the line 54 and the lateral acceleration signal $A_y$ on line 62. The estimation controller 62 generates an estimated lateral velocity of the vehicle 10 based on any suitable algorithm, such as that disclosed in U.S. patent application Ser. No. 11/280,943, titled Vehicle Stability Control with Lateral Dynamics Feedback, filed Nov. 16, 2005, assigned to the assignee of this application and hereinafter incorporated by reference.

The VSES 22 also includes a lateral velocity controller 64 that receives the lateral velocity command signal $V_y$ from the command interpreter 50 and the estimated lateral velocity signal from the lateral velocity estimation controller 60. The lateral velocity controller 64 generates a lateral velocity control component signal that minimizes the difference between the desired lateral velocity of the vehicle 10 and the estimated lateral velocity of the vehicle 10.

The VSES 22 also includes a roll angle estimation controller 66 that receives the hand-wheel angle signal $\delta$ on the line 52, the vehicle speed signal $V_x$ on the line 54 and the lateral acceleration signal $A_y$ on the line 62. The roll angle estimation controller 66 estimates the roll angle of the vehicle 10 based on the input signals by any suitable algorithm. One non-limiting example for estimating the roll angle can be found in U.S. patent application Ser. No. 11/400,844, titled Estimation of Vehicle Roll Rate and Roll Angle Using Suspension Deflection Sensors, filed Apr. 10, 2006, assigned to the assignee of this application and herein incorporated by reference.

The VSES 22 also includes a roll angle controller 68 that receives the roll angle command signal $\phi$ from the command interpreter 50 and the estimated roll angle signal from the roll angle estimation controller 66. The roll angle controller 68 provides a roll control component signal for controlling the vehicle 10 in the roll direction.

The VSES 22 also includes an adder 70 that adds the yaw-rate control component signal from the yaw-rate controller 56, the side-slip control component signal from the lateral velocity controller 64 and the roll control component signal from the roll angle controller 68 to provide an actuator control command signal in all of the degrees-of-freedom for yaw, lateral velocity and roll. The actuator control command signal from the adder 70 can be sent to any or all of the active rear-wheel steering actuator 32, the active front steering actuator 34 and the braking actuators 24, 26, 28 and 30.

Figure 3:
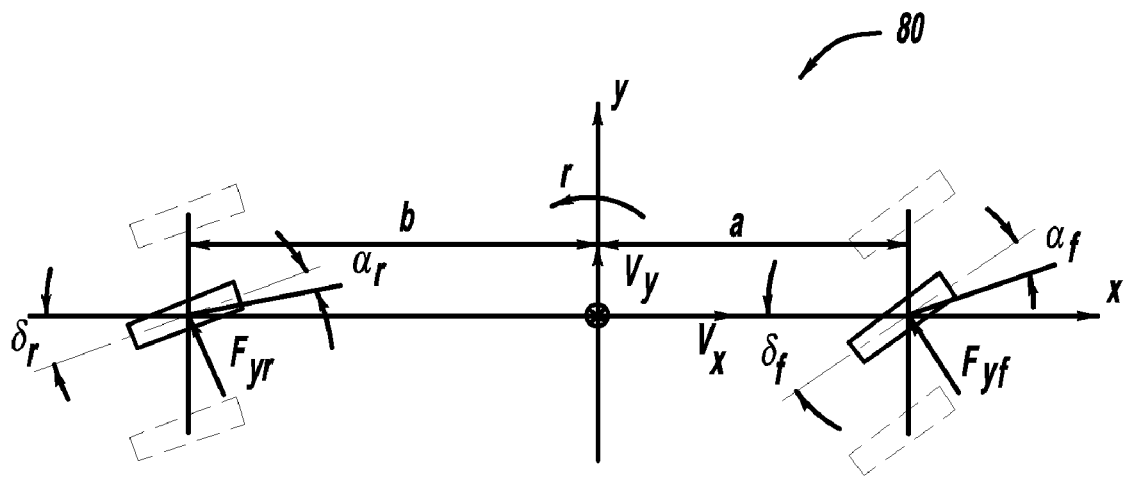
FIG. 3 is a top plan view of a vehicle showing variables used in the three degree-of-freedom vehicle model.
Figure 4:
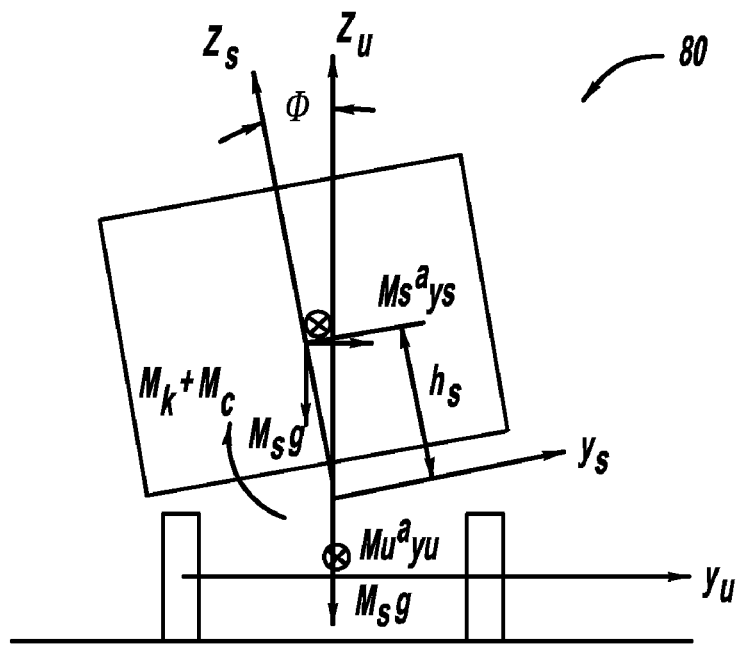
FIG. 4 is a front plan view of a vehicle showing the variables used in the three degree-of-freedom vehicle model.

As mentioned above, the command interpreter 50 uses a three degree-of-freedom vehicle model to generate the yaw-rate command signal r, the lateral velocity command signal $V_y$, and the roll angle command signal $\phi$. The vehicle model employs a non-linear suspension model and a non-linear tire model. FIG. 3 is a top plan view and FIG. 4 is a front view of a vehicle 80 showing variables that will be used in the calculation of the three degree-of-freedom vehicle model of the invention. The vehicle 80 is considered to be a two-mass system consisting of a sprung mass $M_s$ and an unsprung $M_u$, where the sprung mass $M_s$ is constrained to roll about a roll axis with the roll center located at $O_s$. The sprung mass $M_s$ has three degrees-of-freedom, particularly, lateral velocity $V_y$, yaw-rate r and roll angle $\phi$, with a center of gravity (cg) at $CG_s$. The unsprung mass $M_u$ has the same yaw and lateral motions as the sprung mass $M_s$ with the center of gravity at $O_u$, but has no roll motion.

For a vehicle with a constant, or slowly changing forward speed $V_x$, the equations of motion in the vehicle-body fixed coordinate system can be written as:

$$M_u(\dot{V}_y + V_x r) + M_s(\dot{V}_y + V_x r - h_s \ddot{\varphi}) = \qquad (1)$$
$$F_{yf}\cos(\delta_f + \gamma_f \varphi) + F_{yr}\cos(\delta_f + \gamma_f \varphi)$$

$$I_z \dot{r} + I_{xz}\ddot{\varphi} = aF_{yf}\cos(\delta_f + \gamma_f \varphi) - bF_{yr}\cos(\delta_r + \gamma_f \varphi) \qquad (2)$$

$$I_x \ddot{\varphi} + I_{xz}\dot{r} - M_s h_s(\dot{V}_y + V_x r) = M_s g h_s \sin\varphi - K_\varphi \varphi - C_\varphi \dot{\varphi} \qquad (3)$$

Figure 5:
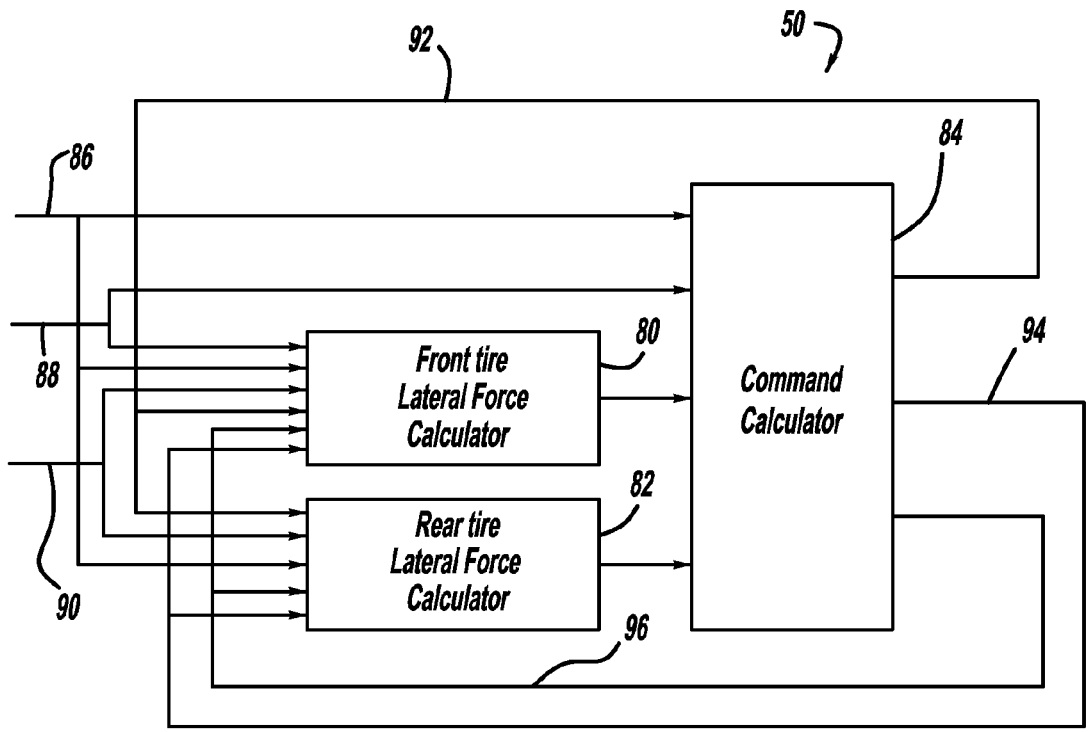
FIG. 5 is a block diagram of the command interpreter shown in FIG. 2.

FIG. 5 is a block diagram of the command interpreter 50. The command interpreter 50 includes a calculator 80 that calculates the front tire lateral force $F_{yf}$, a calculator 82 that calculates the rear tire lateral force $F_{yr}$, and a command calculator 84 that calculates the yaw-rate command signal r, the lateral velocity command signal $V_y$ and the roll angle command signal $\phi$.

The front tire lateral force calculator 80 receives the vehicle speed signal $V_x$ on line 86, the hand-wheel angle signal $\delta$ on line 88, the tire vertical load signal $F_z$ on line 90, the yaw-rate command signal r on line 92, the lateral velocity command signal $V_y$ on line 94 and the roll angle command signal $\phi$ on line 96. Likewise, the rear tire lateral force calculator 82 receives the vehicle speed signal $V_x$ on the line 86, the tire vertical load signal $F_z$ on the line 90, the yaw-rate command signal r on the line 92, the lateral velocity command signal $V_y$ on the line 94 and the roll angle command signal $\phi$ on the line 96. From these values, the calculators 80 and 82 calculate the side-slip angles $\alpha_f$ and $\alpha_r$ for the front and rear of the vehicle as:

$$\alpha_f = \delta_f - \tan^{-1}((ar + V_y)/V_x) + \gamma_f \phi \qquad (4)$$

$$\alpha_r = \delta_r + \tan^{-1}((br + V_y)/V_x) + \gamma_r \phi \qquad (5)$$

Once the calculators 80 and 82 calculate the side-slip angles $\alpha_f$ and $\alpha_r$, then the calculators 80 and 82 can use a suitable look-up table to convert the side-slip angles $\alpha_f$ and $\alpha_r$ to the lateral forces $F_{yf}$ and $F_{yr}$ for the front and rear tires of the vehicle. The look-up table is selected depending on the tire vertical load force $F_z$ in that for different ranges of tire vertical loads, different look-up tables will be used. Note that the difference between the tire slip angle and the side-slip angle is due to suspension/steering compliance.

For typical front and rear lateral forces for a full size SUV, the lateral force increases linearly according to the side-slip angles. At moderate side-slip angles, i.e., about 5°, the force increases at a reduced rate and in a non-linear manner. When the side-slip angle reaches a critical value, such as 10°, the lateral force remains almost constant or even slightly decreases as the side-slip angle increases.

When a vehicle is under limit-handling maneuvering, it may generate a large lateral velocity and roll angle. The model-based approach for stability control discussed above assumes that the large lateral velocity and roll angle are how the driver expects the vehicle to behave. In reality, a vehicle driver usually would prefer only moderate lateral velocity and roll angle, even under extreme driving conditions. Thus, the command interpreter 50 should be modified to include the non-linear and dynamic effects.

When a vehicle generates a large lateral velocity motion, either or both the front and rear tires saturate and the vehicle becomes unstable. The driver, however, being in control of the front steering, would expect the rear tires to remain under control, i.e., not saturated, under all driving conditions. Thus, the present invention proposes to artificially extend the linear range of the rear side-slip so that no saturation occurs even beyond the critical side-slip angle.

Figure 6:
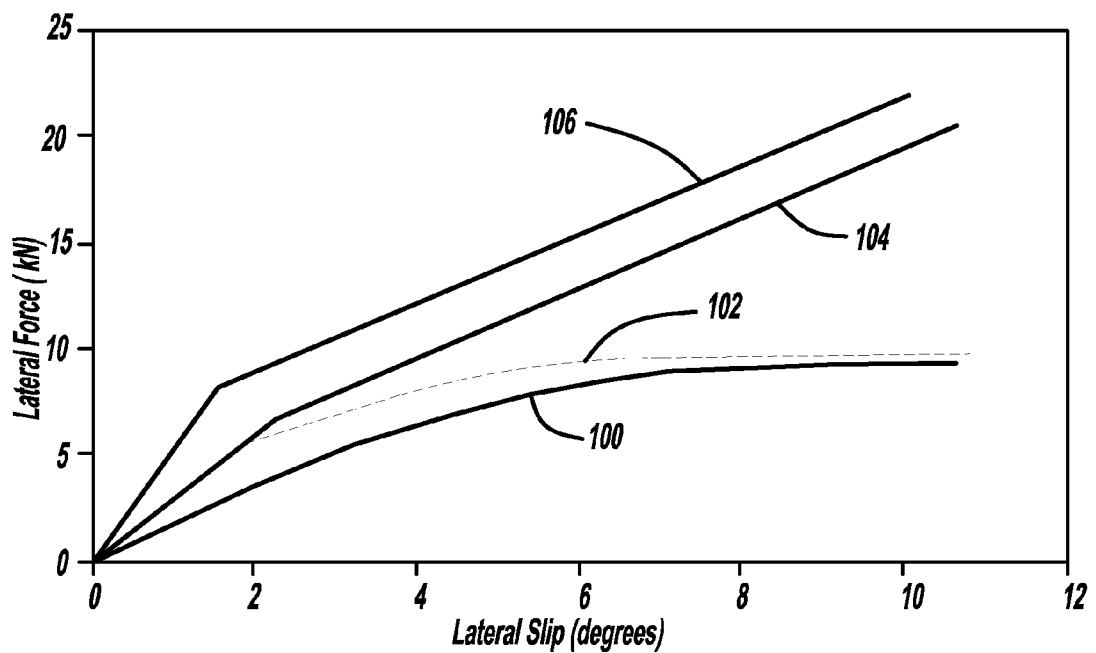
FIG. 6 is a graph with lateral slip on the horizontal axis and lateral force on the vertical axis for calculating the lateral force for the front and rear tires of the vehicle in the command interpreter.

FIG. 6 is a graph with tire lateral slip on the horizontal axis and tire lateral force on the vertical axis. Graph line 100 is the relationship between the lateral slip and the lateral force for the front tires of the vehicle and graph line 102 is the relationship between the lateral slip and the lateral force for the rear tires of the vehicle, prior to the invention where rear tire saturation occurred at large lateral velocity and roll angle. Graph line 104 is the modified relationship between the lateral slip and the lateral force for the rear tires that prevents the lateral force from going into saturation as the lateral slip increases. Graph line 106 represents the relationship between the lateral slip and the lateral force for the rear tires for an increase in tire vertical load $F_z$ for a different look-up table.

Once the look-up table is modified as discussed above, then the calculated side-slip angles $\alpha_f$ and $\alpha_r$ from equations (4) and (5) are used to determine the lateral force for the front tires and the rear tires.

The command calculator 84 receives the vehicle speed signal $V_x$ on the line 86, the hand-wheel angle signal $\delta$ on the line 88, the front tire lateral force signal $F_{yf}$ from the calculator 80 and the rear tire lateral force signal $F_{yr}$ from the calculator 82. Introducing a slip-angle $\beta = V_y/V_x$, the equations of motion can be rewritten as:

$$M\dot{\beta} - M_s h_s \dot{\varphi}/V_x = -Mr + [F_{yf}\cos(\delta_f + \gamma_f \varphi) + F_{yr}\cos(\delta_r + \gamma_f \varphi)]/V_x \quad (6)$$

$$I_z \dot{r} + I_{xz}\ddot{\varphi} = aF_{yf}\cos(\delta_f + \gamma_f \varphi) - bF_{yr}\cos(\delta_r + \gamma_f \varphi) \quad (7)$$

$$I_x \ddot{\varphi} + I_{xz}\dot{r} - M_s h_s \dot{\beta} V_x = M_s h_s V_x r + M_s g h_s \sin\varphi - K_\varphi \varphi - C_\varphi \dot{\varphi} \quad (8)$$

In equations (6)-(8), the axle lateral force is a non-linear function of axle side-slip angle given as:

$$F_y = F_y(\alpha, F_z) \quad (9)$$

Using equations (6)-(8), the calculator 84 can solve for the yaw-rate command signal r, the side-slip signal $\beta(V_y/V_x)$ and the roll command signal $\varphi$. In one embodiment, the calculator 84 makes the following conversions to state variables.

By introducing state variables for side-slip, yaw-rate, roll rate and roll angle, equations (6), (7) and (8) can be written as:

$$A\dot{X} = F(X) \quad (10)$$

Where, $$X = \begin{bmatrix} \beta \\ r \\ \dot{\varphi} \\ \varphi \end{bmatrix} \quad (11)$$

$$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \quad (12)$$

$$F(X) = \begin{bmatrix} \frac{F_{yf}\cos(\delta_f + \gamma_f \varphi) + F_{yr}\cos(\delta_r + \gamma_r \varphi)}{V_x} - Mr \\ aF_{yf}\cos(\delta_f + \gamma_f \varphi) - bF_{yr}\cos(\delta_r + \gamma_r \varphi) \\ M_s H_s V_x r + M_s g H_s \sin(\varphi) - K_\varphi \varphi - C_\varphi \dot{\varphi} \\ \dot{\varphi} \end{bmatrix} \quad (13)$$

-continued $$\Delta = MI_z I_x - MI_{xz}^2 - M_s^2 H_s^2 I_z \quad (14)$$

$$a_{11} = \frac{I_z I_x - I_{xz}^2}{\Delta} \quad (15)$$

$$a_{12} = \frac{-I_z M_s \frac{H_s}{V_x}}{\Delta} \quad (16)$$

$$a_{13} = \frac{I_z M_s \frac{H_s}{V_x}}{\Delta} \quad (17)$$

$$a_{14} = 0 \quad (18)$$

$$a_{21} = \frac{-M_s H_s I_{xz} V_x}{\Delta} \quad (19)$$

$$a_{22} = \frac{MI_x M_s^2 H_s^2}{\Delta} \quad (20)$$

$$a_{23} = \frac{-MI_{xz}}{\Delta} \quad (21)$$

$$a_{24} = 0 \quad (22)$$

$$a_{31} = \frac{M_s H_s I_z V_x}{\Delta} \quad (23)$$

$$a_{32} = \frac{-MI_{xz}}{\Delta} \quad (24)$$

$$a_{33} = \frac{MI_z}{\Delta} \quad (25)$$

$$a_{34} = 0 \quad (26)$$

$$a_{41} = 0 \quad (27)$$

$$a_{42} = 0 \quad (28)$$

$$a_{43} = 0 \quad (29)$$

$$a_{44} = 1 \quad (30)$$

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A control system for providing a yaw-rate command signal, a lateral velocity command signal and a roll command signal in a vehicle, said control system comprising:
   a plurality of vehicle sensors for measuring vehicle parameters and providing sensor signals;
   a front tire lateral force calculator for calculating a lateral force on front tires of the vehicle using at least some of the plurality of sensor signals and providing a front tire lateral force signal;
   a rear tire lateral force calculator for calculating a lateral force on rear tires of the vehicle using at least some of the plurality of sensor signals and providing a rear tire lateral force signal, wherein the rear tire lateral force signal is modified so that it does not saturate in response to large side-slips; and
   a command calculator for calculating the yaw-rate command signal, the lateral velocity command signal and the roll command signal based on at least some of the plurality of sensor signals and the front and rear tire lateral force signals.

2. The system according to claim 1 wherein the plurality of sensors include a vehicle speed sensor for providing a vehicle speed signal of the speed of the vehicle, a yaw rate sensor for providing a yaw-rate signal of the yaw rate of the vehicle, a hand-wheel angle sensor for providing a hand-wheel angle signal of the position of a vehicle hand-wheel, a lateral acceleration sensor for providing a lateral acceleration signal of the lateral acceleration signal of the vehicle and a tire vertical force sensor for providing a signal of the vertical force on the vehicle tires.

3. The system according to claim 2 wherein the command calculator uses the vehicle speed signal and the hand-wheel angle signal to calculate the yaw-rate command signal, the lateral velocity command signal and the roll command signal.

4. The system according to claim 2 wherein the front tire lateral force calculator uses the vehicle speed signal, the hand-wheel angle signal, the tire vertical force signal, the lateral velocity command signal, the roll command signal and the yaw-rate command signal to determine the front tire lateral force signal.

5. The system according to claim 2 wherein the rear tire lateral force calculator uses the vehicle speed signal, the tire vertical force signal, the lateral velocity command signal, the roll command signal and the yaw-rate command signal to determine the rear tire lateral force signal.

6. The system according to claim 1 wherein the front tire lateral force calculator and the rear tire lateral force calculator calculate the side-slip of the front and rear tires and convert the side-slip to the front and rear lateral force signals.

7. The system according to claim 6 wherein the front tire lateral force calculator and the rear tire lateral force calculator use look-up tables to convert the side-slip of the front and rear tires to the lateral force signals.

8. The system according to claim 6 wherein the conversion from the side-slip to the lateral force changes as tire vertical force changes.

9. The system according to claim 6 wherein the front tire lateral force calculator and the rear tire lateral force calculator use the following equations to calculate the front and rear side-slip:

$$\alpha_f = \delta_f - \tan^{-1}((ar+V_y)/V_x) + \gamma_f \phi)$$

$$\alpha_r = \delta_r + \tan^{-1}((br+V_y)/V_x) + \gamma_r \phi)$$

where $\alpha_f$ is the front side-slip, $\alpha_r$ is the rear side-slip, $\delta_f$ is the front tire steering angle, $\delta_r$ is the rear tire steering angle, r is vehicle yaw rate, $V_x$ is vehicle speed, $V_y$ is vehicle lateral acceleration, $\phi$ is vehicle roll and a and b are constants associated with the vehicle wheel-base.

10. The system according to claim 1 wherein the command calculator uses the following equations to calculate the yaw-rate command signal, the lateral velocity command signal and the roll command signal:

$$M\dot{\beta} - M_s h_s \dot{\phi}/V_x = -Mr + [F_{yf}\cos(\delta_f + \gamma_f \varphi) + F_{yr}\cos(\delta_r + \gamma_f \varphi)]/V_x$$

$$I_z \dot{r} + I_{xz}\ddot{\phi} = aF_{yf}\cos(\delta_f + \gamma_f \varphi) - bF_{yr}\cos(\delta_r + \gamma_f \varphi)$$

$$I_x \ddot{\phi} + I_{xz}\dot{r} - M_s h_s \dot{\beta} V_x = M_s h_s V_x r + M_s g h_s \sin\varphi - K_\varphi \varphi C_\varphi \dot{\varphi}.$$

11. The system according to claim 1 wherein the front tire lateral force calculator, the rear tire lateral force calculator and the command calculator are part of a command interpreter that employs a three degree-of-freedom vehicle model with non-linear suspension and tire characteristics to determine the yaw-rate command signal, the lateral velocity command signal and the roll command signal.

12. A control system for providing a yaw-rate command signal, a lateral velocity command signal and a roll command signal in a vehicle, said system comprising:

a vehicle speed sensor for providing a vehicle speed signal of the speed of the vehicle;

a yaw rate sensor for providing a yaw-rate signal of the yaw rate of the vehicle;

a hand-wheel angle sensor for providing a hand-wheel angle signal of the position of a vehicle hand-wheel;

a lateral acceleration sensor for providing a lateral acceleration signal of the lateral acceleration signal of the vehicle;

a vertical tire load sensor for providing a signal of the vertical force on vehicle tires;

a front tire lateral force calculator for calculating a lateral force on front tires of the vehicle, said front tire lateral force calculator using the vehicle speed signal, the hand-wheel angle signal, the tire vertical force signal, the lateral velocity command signal, the roll command signal and the yaw-rate command signal to calculate the side-slip of the front tires, said front tire lateral force calculator converting the side-slip to a front tire lateral force signal;

a rear tire lateral force calculator for calculating a lateral force on rear tires of the vehicle, said rear tire lateral force calculator using the vehicle speed signal, the tire vertical force signal, the lateral velocity command signal, the roll command signal and the yaw-rate command signal to calculate the side-slip of the rear tires, said rear tire lateral force calculator converting the side-slip to a rear tire lateral force signal, wherein the rear tire lateral force signal is modified so that it does not saturate in response to large side-slips; and a command calculator for calculating the yaw-rate command signal, the lateral velocity command signal and the roll command signal based on the vehicle speed signal, the hand-wheel angle signal and the front and rear tire lateral force signals.

13. The system according to claim 12 wherein the front tire lateral force calculator and the rear tire lateral force calculator use look-up tables to convert the side-slip of the front and rear tires to the lateral force signals.

14. The system according to claim 12 wherein the conversion from the side-slip to the lateral force changes as tire vertical force changes.

15. The system according to claim 12 wherein the front tire lateral force calculator and the rear tire lateral force calculator use the following equations to calculate the front and rear side-slip:

$$\alpha_f = \delta_f - \tan^{-1}((ar+V_y)/V_x) + \gamma_f \phi)$$

$$\alpha_r = \delta_r + \tan^{-1}((br+V_y)/V_x) + \gamma_r \phi)$$

where $\alpha_f$ is the front side-slip, $\alpha_r$ is the rear side-slip, $\delta_f$ is the front tire steering angle, $\delta_r$ is the rear tire steering angle, r is vehicle yaw rate, $V_x$ is vehicle speed, $V_y$ is vehicle lateral acceleration, $\phi$ is vehicle roll and a and b are constants.

16. The system according to claim 12 wherein the command calculator uses the following equations to calculate the yaw-rate command signal, the lateral velocity command signal and the roll command signal:

$$M\dot{\beta} - M_s h_s \dot{\varphi}/V_x = -Mr + [F_{yf}\cos(\delta_f + \gamma_f \varphi) + F_{yr}\cos(\delta_r + \gamma_f \varphi)]/V_x$$

$$I_z \dot{r} + I_{xz}\ddot{\varphi} = aF_{yf}\cos(\delta_f + \gamma_f \varphi) - bF_{yr}\cos(\delta_r + \gamma_f \varphi)$$

$$I_x \ddot{\varphi} + I_{xz}\dot{r} - M_s h_s \dot{\beta} V_x = M_s h_s V_x r + M_s g h_s \sin\varphi - K_\varphi \varphi C_\varphi \dot{\varphi}.$$

17. The system according to claim 12 wherein the front tire lateral force calculator, the rear tire lateral force calculator and the command calculator are part of a command interpreter that employs a three degree-of-freedom vehicle model with non-linear suspension and tire characteristics to determine the yaw-rate command signal, the lateral velocity command signal and the roll command signal.

18. A command interpreter for providing vehicle stability control commands, said command interpreter including a front tire lateral force calculator configured to calculate a front side-slip angle and convert the front side-slip angle to a lateral force on the front tires of the vehicle using a look-up table, a rear tire lateral force calculator configured to calculate a rear side-slip angle and convert the rear side-slip angle to a lateral force on the rear tires using a look-up table, and a command calculator for calculating the stability control commands using a three degree-of-freedom vehicle model and the front and rear tire lateral forces; wherein the front tire lateral force calculator and the rear tire lateral force calculator modify the relationship between the side-slip angle and the lateral force so that the lateral force does not become saturated.

19. The command interpreter according to claim 18 wherein the vehicle stability control commands include a yaw-rate command, a lateral velocity command and a roll command.

20. The system according to claim 18 wherein the command interpreter employs a three degree-of-freedom vehicle model with non-linear suspension and tire characteristics to determine the yaw-rate command signal, the lateral velocity command signal and the roll command signal.

* * * * *